United States Patent Office 2,819,230
Patented Jan. 7, 1958

2,819,230
HEAT TREATING OF CHROMIA-ALUMINA CATALYSTS

Harold A. Strecker, Bedford, Ohio, assignor to The Standard Oil Company, Cleveland, Ohio, a corporation of Ohio No Drawing. Application December 23, 1953
Serial No. 400,088

5 Claims. (Cl. 252—465)

The present invention relates to an improvement in the manufacture of chromia-alumina catalysts.

In recent years, the popularity of fluidized catalytic processes has developed considerably and, in particular, the petroleum industry has adapted many of its hydrocarbon conversion and reforming reactions to fluidized processes.

In a fluidized process, as those skilled in the art are aware, the catalyst is maintained in a fluidized suspension by the action of gases or vapors which are continually passed through the reaction vessel. Therefore, by the very nature of the process, the individual particles of catalyst are subjected to a great amount of abrasion as a result of collisions with other particles of catalyst and with the walls of the reactor. These collisions invariably result in the breaking off of smaller particles of catalyst from the original particles, which impairs the functioning of the catalyst. In the art, the breaking up of the catalyst is known as "attrition" and the rate at which the catalyst is broken up into smaller particles is called the "attrition rate" of the catalyst.

One class of catalysts which has been widely used in the reforming of hydrocarbons are those known as chromia-alumina catalysts, i. e., catalysts composed predominantly of chromia and alumina but which also may contain minor amounts of one or more promoting oxides such as the oxides of platinum, palladium, antimony and other metals. When catalysts of this class are intended for use in fluidized reforming processes, it is preferable that they be prepared in the form of very small spheres, normally called microspheres. In copending application Serial No. 400,087, filed December 23, 1953, in which the present applicant is a joint inventor, there is disclosed one method by which microspheres of chromia-alumina catalysts can be prepared.

While microspheres of chromia-alumina catalysts are effective in fluidized processes, the catalysts generally have an attrition rate which is greater than that normally desired and which is a disadvantage in their use. Therefore, the art has searched for means by which the attrition rate of chromia-alumina catalysts can be lessened.

In accordance with the present invention, I have found the microspheres of chromia-alumina catalyst can be heat treated in a specified manner to materially reduce the attrition rate of the catalyst. The process by which this is achieved comprises heating microspheres of chromia-alumina catalyst to a temperature in excess of 1000° F., and then quenching the microspheres by immersion in water.

The process is applicable to any chromia-alumina catalyst which contains up to about 25 mol percent of chromia. The catalyst may also contain minor amounts of one or more promoting oxides, such as the oxides of platinum, palladium, antimony, cadmium, thorium, indium, etc. Usually, such promoting oxides are present in amounts less than 20% by weight of the total catalyst. The preparation of such catalysts is described in the aforesaid copending application Serial No. 400,087, filed December 23, 1953.

The heat treatment of the catalyst microspheres according to the process of the invention is preferably performed in an inert atmosphere, such as an atmosphere of nitrogen or other inert gas.

The factors of time and temperature in the heating step do not appear to be interrelated. The time of heating does not appear to be at all critical and I can obtain good results by heating the catalyst for from about 45 minutes to about 8 hours. Longer periods of heating are not harmful but no advantage is to be obtained thereby.

To a certain extent, however, the temperature of the heat treatment is critical. This is because both the hardness of the catalyst and its attrition rate are influenced by the heat treatment. Thus, for example, while I can achieve a satisfactory attrition rate by heat treating the catalyst at 900° F. followed by cooling and quenching, the resultant catalyst will soften when heated. The catalyst is therefore unsatisfactory from the standpoint of catalyst regeneration because conventional regeneration temperatures, which usually exceed 1000° F., lead to softening of the catalyst.

In further connection with the selection of a temperature for the heat treatment, I have found that there is not a direct relationship between the temperature of heat treatment and the attrition rate of the catalyst. For instance, in the process of the invention, when the temperature of the heat treatment is varied from 900° F. to 1400° F., the maximum attrition rate is found when the temperature of the heat treatment is about 1000° F. and the minimum attrition rate is usually found at about 900° F. However, as previously explained, catalysts heated to only 900° F. soften excessively at regeneration temperatures. Above 1000° F., the attrition rate appears to decrease and the catalysts so-treated do not soften at conventional regeneration temperatures. Therefore, the temperature of the heat treatment should exceed 1000° F. and I prefer temperatures within the approximate range of 1200 to 1400° F. However, the temperatures may be as high as above 1600° F.

Regardless of the temperature of the treatment, I have found that subsequent quenching in water is essential to produce a catalyst of suitable low attrition rate. For example, at any given temperature of heat treatment, a catalyst which is subsequently quenched in water will have a much lower attrition rate than another portion of the same catalyst which is not quenched in water.

Following the heat treatment and before quenching, the catalyst should be allowed to cool partially to a temperature within the approximate range of 500 to 700° F. This temperature, however, does not appear to be critical and the limits given are merely suggested limits.

After the catalyst has partially cooled, it is then immersed in water. I prefer that the water be at the boiling point although water at room temperature can also be used for the quenching.

In order to illustrate the process of the invention and its beneficial effects, the following examples are presented. Parts and percentages are by weight except where otherwise specified.

Example

A quantity of a chromia-alumina catalyst analyzing about 10 mol percent of chromia and 90 mol percent of alumina was prepared according to the procedure described in copending application Serial No. 400,087, filed December 23, 1953, which involved spray drying of a slurry of chromia-alumina hydrogel to produce microspheres of catalyst.

The catalyst as prepared above was screened to separate microspheres larger than 325 mesh (44 microns) for use in the subsequent procedure. The screened catalyst was then soaked in a 10% aqueous ammonium sulfate solution to remove sodium ions by exchange with ammonium ions, and was then washed free of sulfate with water. The catalyst was then dried with steam at a temperature of about 230 to 240° F.

The quantity of catalyst was next divided into eight equal portions and each portion was subjected to a different treatment. Four of the portions were simply heated in nitrogen at different temperatures for 4 hours and then allowed to cool. Four other portions of the catalyst were treated according to the process of the invention by heating for 4 hours in nitrogen at various temperatures, partially cooling to about 600° F., and then immersing the partially cooled catalyst in boiling water. Those portions of the catalyst which were subjected to quenching were then oven-dried at a temperature of 230 to 240° F.

The eight portions of catalyst were each subjected to an accelerated laboratory attrition test which is described by Forsythe and Hertwig, Industrial and Engineering Chemistry, volume 41, pages 1200–1206 (1949). In this test, a high velocity air stream is passed through a 50 gram sample of the catalyst, contained in a 1 inch I. D. glass pipe, for 1 hour. At the end of this time, the increase in the amount of material smaller than 325 mesh is determined by screen analysis. This value, expressed as percent of greater than 325 mesh material present in the charge, is taken as the attrition rate.

The following attrition rates were determined for the eight portions of catalyst:

| Treatment: | Attrition rate percent/hour |
| --- | --- |
| None | <75 |
| 4 hours at 900° F | [1]25 |
| 4 hours at 1000° F | 42 |
| 4 hours at 1200° F | 73 |
| 4 hours at 1400° F | 32 |
| 4 hours at 900° F., quenched at 600° F. in boiling water | [1]5 |
| 5 hours at 100° F., quenched at 600° F. in boiling water | 29 |
| 4 hours at 1200° F., quenched at 600° F. in boiling water | 15 |
| 4 hours at 1400° F., quenched at 600° F. in boiling water | 5–10 |

[1] Even though attrition rate is low, these catalysts soften excessively at regeneration temperatures.

It is apparent from the above data that the process of the invention has resulted in a material decrease in the attrition rate of the catalyst whereas mere heating without quenching in water results in a catalyst of much higher attrition rate. As previously explained, the heat treatment at 900° F. followed by partial cooling and quenching in water is unsatisfactory from the standpoint of catalyst regeneration even though a very low attrition rate is realized from this treatment. Therefore, the invention includes temperatures in excess of 1000° F., preferably from about 1200 to about 1400° F., for the initial heat treating step.

It can also be seen from the data that the attrition rates obtained by the process of the invention compare very favorably with the attrition rates of the commercial microsphere silica-alumina catalysts which generally have an attrition rate from about 18 to 27% by the same test method.

It is intended to cover all changes and modifications in the examples of the invention, herein given for purposes of disclosure, which do not constitute departure from the spirit and scope of the appended claims.

I claim:

1. A process for lowering the attrition rate of a chromia-alumina catalyst which comprises (1) heating microspheres of said catalyst in an inert atmosphere to a temperature of 1000 to 1600° F. for at least about 45 minutes, (2) partially cooling said microspheres to a temperature above about 500° F. before quenching, and (3) then quenching the partially cooled microspheres by immersing in water.

2. A process for lowering the attrition rate of a chromia-alumina catalyst which comprises (1) heating microspheres of chromia-alumina catalyst in an inert atmosphere to a temperature of 1000 to 1600° F. for at least about 45 minutes, (2) partially cooling said microspheres to a temperature of about 500 to 700° F. before quenching, and (3) then quenching the partially cooled microspheres by immersing in water.

3. A process for lowering the attrition rate of a chromia-alumina catalyst which comprises (1) heating microspheres of chromia-alumina catalyst in an inert atmosphere to a temperature within the approximate range of 1200 to 1400° F. for at least about 45 minutes, (2) partially cooling the microspheres to a temperature of about 500 to 700° F. before quenching, and (3) then quenching the partially cooled microspheres by immersing in water.

4. A process according to claim 1 in which the water is at the boiling point.

5. A process according to claim 1 in which the inert atmosphere is nitrogen.

References Cited in the file of this patent

UNITED STATES PATENTS

| 2,052,254 | Shover | Aug. 25, 1936 |
| 2,400,091 | Alfthan | May 14, 1946 |
| 2,468,857 | Anderson et al. | May 3, 1949 |
| 2,509,014 | Payne et al. | May 23, 1950 |
| 2,635,082 | Smith | Apr. 14, 1953 |